No. 745,478. PATENTED DEC. 1, 1903.
I. A. BROCK.
JOINTED BEAM FOR CULTIVATORS.
APPLICATION FILED JULY 20, 1903.
NO MODEL.
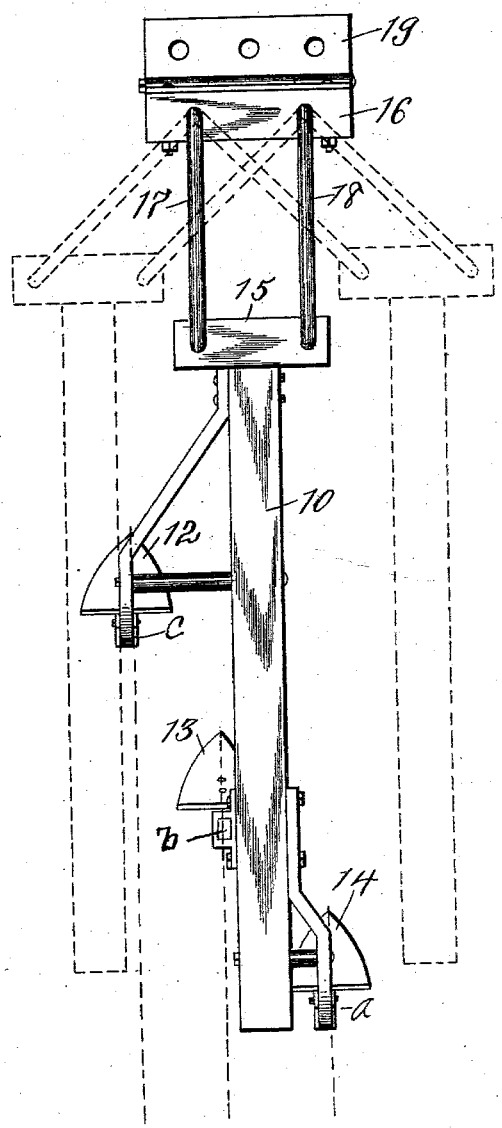

No. 745,478.

Patented December 1, 1903.

UNITED STATES PATENT OFFICE.

IRA A. BROCK, OF MONROE, IOWA.

JOINTED BEAM FOR CULTIVATORS.

SPECIFICATION forming part of Letters Patent No. 745,478, dated December 1, 1903.

Application filed July 20, 1903. Serial No. 166,408. (No model.)

*To all whom it may concern:*

Be it known that I, IRA A. BROCK, a citizen of the United States, residing at Monroe, in the county of Jasper and State of Iowa, have invented a new and useful Jointed Beam for Cultivators, of which the following is a specification.

In cultivating corn, especially on the sides of hills, cultivator-beams are liable to incline laterally relative to rows of plants and the line of advance, and by so doing run the shovels attached to the beams in one furrow in place of making three distinct furrows in parallel line with each other and a row of plants, and also to throw loose ground upon plants to cover them up when the beam inclines toward the row of plants to which ground is to be moved.

My object is to retain the shovels in position while in operation as required to make three distinct equidistant parallel furrows in parallel line with a row of plants as a cultivator is advanced in parallel line with a row of plants; and my invention consists in the construction and combination of a jointed beam with a hinge adapted to be fixed to a carriage-axle or cultivator-frame, as hereinafter set forth, pointed out in my claims, and illustrated in the accompanying drawing, that is a plan view in full lines and dotted lines when deflected to the right or left.

The numeral 10 designates a beam, and 12, 13, and 14 cultivator-shovels fixed to the beam in such a manner that when the beam is advanced parallel with a straight line each shovel will make a distinct furrow, and the furrows will be in parallel position with each other and a straight row of plants whenever the beam is parallel with the line of advance.

A cross-head 15 is fixed to the front end of the beam 10, and a corresponding piece 16, of wood or metal, is pivotally connected with the cross-head by means of two metal bars or links 17 and 18, bent at right angles at their ends to enter holes in the parallel parts 15 and 16 or in any suitable way as required to allow lateral motions to the beam 10 and cross-head 15 and said links, as indicated by full and dotted lines.

A leaf-hinge 19 is fixed to the front of the part 16 in such a manner that the complete device can be hinged to the axle of a cultivator-carriage or carriage-frame as required to allow vertical motion only to the piece 16, while at the same time the links 17 and 18 and the beam 10 can vibrate to the right or left freely when the horses deflect from a straight line or when the cultivator is advanced on the side of a hill.

Standards $a$, $b$, and $c$ are fixed to the beam 10 to operate shovels attached thereto as required to produce three equidistant furrows at all times parallel with each other, with the line of advance, and also parallel with the row of plants cultivated thereby.

Having thus described the purpose of my invention, its construction, and operation, the utility thereof will be readily understood by persons familiar with the art to which it pertains, and

What I claim as new, and desire to secure by Letters Patent, is—

1. A cultivator-beam having a cross-head at its front end extending horizontally and a corresponding cross-piece pivotally connected with said cross-head by means of two parallel links in a horizontal plane and means for hinging the pivoted cross-piece to a cultivator-carriage, for the purposes stated.

2. A cultivator-beam, standards carrying shovels, a cross-head fixed to the front end of the beam to extend horizontally, a corresponding cross-piece, two parallel links in a horizontal plane pivotally connected with the fixed cross-head and the corresponding cross-piece and a hinge fixed to the said pivoted cross-piece; arranged and combined to operate in the manner set forth for the purposes stated.

IRA A. BROCK.

Witnesses:
E. C. EMMACK,
GUSSIE GRIEBELING.